Feb. 25, 1964  K. V. BAILEY  3,122,665
POSITION CONTROL TRANSDUCER AND SYSTEM
Filed Sept. 25, 1961  2 Sheets-Sheet 1

INVENTOR.
KNIGHT BAILEY.
BY Allen M Krass
ATTORNEY

Feb. 25, 1964     K. V. BAILEY     3,122,665
POSITION CONTROL TRANSDUCER AND SYSTEM
Filed Sept. 25, 1961     2 Sheets-Sheet 2
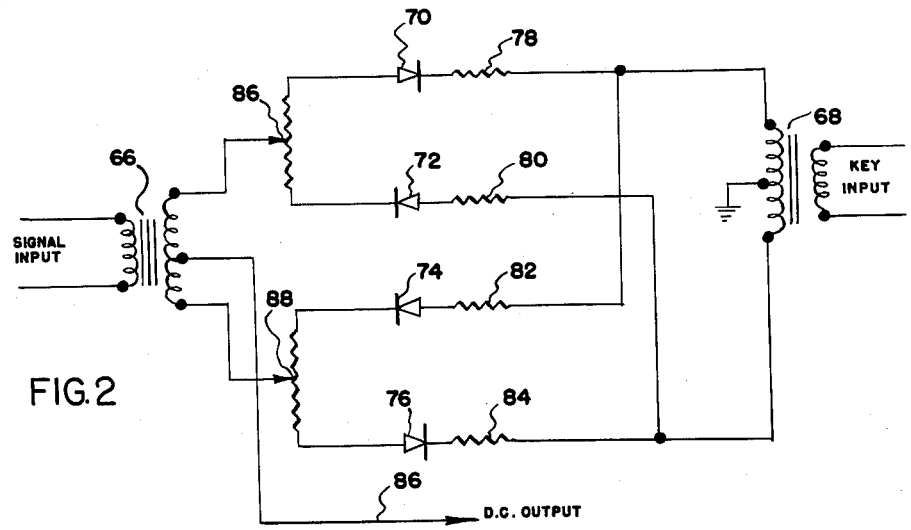
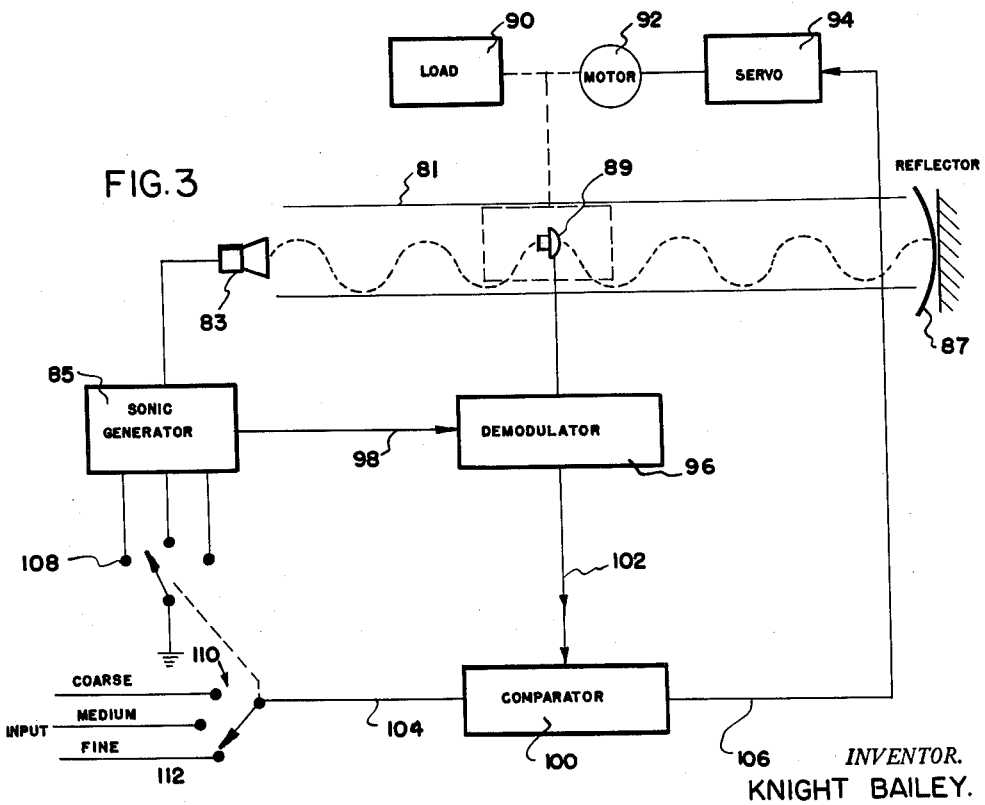
INVENTOR.
KNIGHT BAILEY.
BY
ATTORNEY

United States Patent Office 3,122,665
Patented Feb. 25, 1964

3,122,665
POSITION CONTROL TRANSDUCER AND SYSTEM
Knight V. Bailey, Allen Park, Mich., assignor to The Bendix Corporation, Southfield, Mich., a corporation of Delaware
Filed Sept. 25, 1961, Ser. No. 140,574
6 Claims. (Cl. 310—26)

This invention relates to a system for controlling the position of a movable member and to a transducer for converting physical position into an electrical signal, which transducer forms part of such position control system.

An important class of position control systems utilize a servo technique in which an electrical signal representative of a particular position is generated and is compared to an actual position signal in order to derive a control signal. The desired position signal is varied in accordance with input data which is often in numerical form. The actual position signal is derived from a transducer.

These transducers may be divided into two general classes, absolute and incremental, depending upon whether the electrical signal they provide varies as a function of the distance from a particular point or simply indicates an incremental movement of the controlled member. The present invention relates to a control system employing a unique form of absolute position transducer.

Absolute position transducers generally employ an elongated member disposed parallel to a particular path of motion capability of the movable device. A pickup unit attached to the moving device operates in conjunction with the elongated member to derive an electrical signal proportional to a distance from a reference point on the motion path. Previous transducers of this class have employed an elongated member which has some physical or electrical property which varies along its length such as optical gradings, sinusoidally varying electrical conductors and the like. These devices must be constructed to an accuracy significantly greater than that of the accuracy of the positioning system since any inaccuracy in their construction or variation in their physical characteristics will result in proportionally greater inaccuracy in the total system.

It is an object of the present invention to provide an absolute position transducer employing a standing wave of radiation as its elongated member. The radiation may be through a vacuum, the atmosphere, or any gaseous, liquid or solid medium. As long as the medium is homogeneous the positional accuracy of the standing wave is limited only by the stability of the transmitter which generates the wave, and the position of the reflector which returns the energy toward the transmitter on the velocity constant of the transmission medium. A frequency control system may be employed for the transmitter using feed-back techniques to insure a very high degree of accuracy of the standing wave.

A pickup is employed with the transducer which generates an electrical signal proportional to its position from a reference point as a function of the phase displacement of the standing wave at the pickup point with relation to the reference point. The system compares this signal to another signal representative of the desired position in order to develop a control signal for powering the moving device.

The advantages of the present transducer over previous absolute transducers lies in its low cost, and the fact that its total accuracy is not dependent upon the configuration of a physical member but only upon the electronic circuitry employed. The system employing the transducer has advantages over previous systems in that the frequency of the standing wave may be varied to provide a sequence of positioning accuracies. Thus a relatively long standing wave may first be generated and the position of the pickup adjusted to a close position with respect to that wave. Then successively shorter wave lengths may be generated so as to move the member to successively finer positions.

A further point of novelty of the present invention lies in the nature of the radiated wave and the medium through which it is transmitted as will be subsequently described in the detailed description of a preferred embodiment of the invention. In that embodiment the transmitter takes the form of a sinusoidal electrical generator which powers an electro-magnet. A taut wire of a magnetized magnetostrictive material is disposed within the magnetic field. The variations in the field cause expansions and contractions in the portion of the wire exposed to the field. These length variations are propogated along the wire which is terminated in such a manner as to reflect energy at such a phase relation to the originally radiated energy as will form a standing wave along the wire. These variations in the length of the magnetostrictive wire generate a magnetic sinusoidally varying field along the length of the wire. This field is sensed by a pickup coil which generates a voltage sinusoidally related to the angle of the standing wave at the pickup point and therefore a function of the distance of the pickup coil from the generator. Alternatively, a fixed magnetic field may be used in the pickup head and variations in the localized length of magnetostrictive wire may be sensed in terms of its varying permeability. The wave might also be propogated along the wire in a torsional mode as opposed to a longitudinal mode.

In the preferred embodiment of the invention two pickup coils are employed which are displaced from one another by a quarter wave length. Thus the voltages generated in the two pickup coils represent the sine and cosine of the position of the pickup head with respect to the beginning of one cycle of the standing wave. In this manner the pickup signals unambiguously represent the position of the pickup head within one entire cycle of the standing wave. If only a single pickup were used, the position might only be unambiguously determined within one half cycle.

As has been noted, in order to fully position the pickup head with respect to the wire a series of standing waves of decreasing length are generated. The first wave generated has a length equal to the capability of the positioning system and successive waves might be shorter in order to achieve a finer positioning accuracy. Alternatively, a relatively fine standing wave may be generated originally and the rough positioning achieved by counting the number of waves the pickup passes in the manner of an incremental positioning system.

Although the preferred embodiment of the present invention which will be subsequently described in detail is a positioning system of a point-to-point variety, it should be understood that the many aspects of the present invention are equally applicable to a system in which the rate of motion of the movable member must be controlled as well as its end point of motion. Accordingly, the present transducer might be useful in connection with a phase modulated digital servo system such as that described in U.S. Patent No. 3,011,110 issued November 28, 1961, to Yu Chi Ho and E. Calvin Johnson and assigned to the assignee of the present application.

Other objects, advantages and applications of the present invention will be made apparent by the following detailed description of a perferred embodiment of the invention. The description makes reference to the accompanying drawings in which:

FIGURE 2 is a schematic view of one of the demodulators illustrated in block form in FIGURE 1; and FIGURE 3 is a schematic drawing in block form illustrating a second embodiment of the invention.

Figure 1:
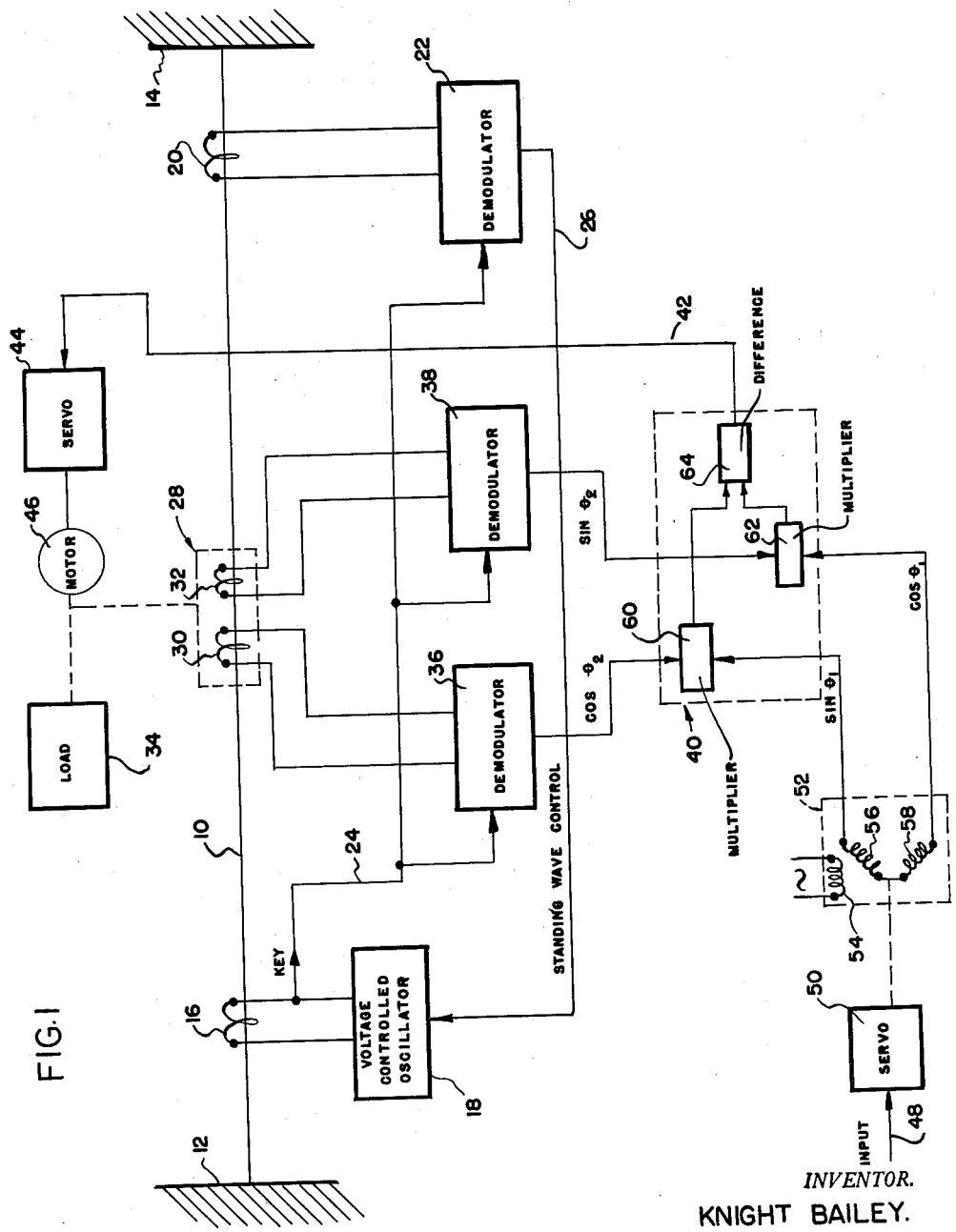
FIGURE 1 is a schematic view of a first, preferred embodiment of the invention, illustrating certain of the sub-circuits in block form.

In the preferred embodiment of the invention disclosed in FIGURES 1 and 2 the standing wave is generated as linear variation propagated along a magnetostrictive wire 10. The wire 10 is tightly drawn between two fixed supports 12 and 14. A .050 inch diameter nickel wire has proved satisfactory in this application. The wire is excited adjacent to one support 12 by a coil 16 which is wrapped about the wire, and is sinusoidally energized by a variable frequency voltage controlled oscillator 18. In practice a coil of 220 turns energized with an average of 0.3 volt has proven satisfactory. A second coil 20 is wrapped about the wire 10 adjacent to its opposite termination 14 and is connected to a demodulator 22 which also has a phase reference keying input on line 24 from the output of the voltage controlled oscillator 18.

Several identical demodulators are used in the circuitry and they all function as phase detectors. In this manner they provide an output voltage which is a function of the phase difference between their input voltage and the key voltage. The circuit and internal operation of a demodulator will be subsequently described in detail.

The demodulator 22 provides a direct current voltage output on line 26 which is a function of the phase difference between its keying voltage input 24 and the voltage at the pickup coil 20. This phase detection voltage 26 is fed back to the voltage controlled oscillator 18 and acts to adjust its frequency drive 20 so as to bring voltage to zero. The voltage output on line 26 is zero when the frequency of the oscillator 18 is such as to provide the proper wave length and increases in an appropriate direction as the frequency varies from this point. The voltage variations act to drive the oscillator 18 in the proper direction.

Since the coils 16 and 20 are a fixed distance from one another, and the pickup coil 20 controls the frequency of the voltage applied to the coil 16 in such a manner as to maintain a particular phase relationship between the two, the arrangement insures that the frequency of the transmitter will be such so as to maintain a standing wave of constant length along the line 10, thus, the system is independent of any distance variation which might occur between the support points 12 and 14, or any variation in the velocity constant of the wire 10.

The pickup head, generally indicated at 28 contains two coils 30 and 32 which are displaced from one another by one-quarter of the standing wave length, or 90 degrees. The pickup head 28 is physically connected to the load 34 which is to be positioned by the system. The pickup 28 thus moves along the wire 10 which is displaced parallel to the motion path of the load 34, as the load is positioned.

The pickup coil 30 provides its signal to a demodulator 36 while the pickup coil 32 provides a signal to the demodulator 38. Both of the demodulators have as their key input the signal from the line 24. Since the pickup coils 30 and 32 are displaced by 90 degrees, the outputs of the demodulators 36 and 38 respectively represent the cosine and the sine of the angular position of the pickup 28 with respect to the beginning of the standing wave, and thus with respect to the position of the generator coil 16. These signals are compared to a desired position signal in a comparator 40 to provide an output signal on line 42 to a servo-mechanism 44. The servo-mechanism controls the output of an electric motor 46 which drives both the load 34 and the pickup 28.

In the preferred embodiment the desired position signal is represented by a voltage introduced on line 48 to a second servo system 50. This servo positions the movable coils 56 and 58 of a resolver 52 which has a sinusoidal voltage applied to its stationary coil 54. Thus the movable coils of the resolver 56 and 58 provide voltages which are proportional to the sine and the cosine of the angle represented by the input voltage 48, which will be termed $\theta_1$. The desired sine voltage from the coil 56 is introduced to a multiplier unit 60 within the comparator 40 which also has an input from the demodulator 36 and provides an output proportional to the cosine of the actual displacement angle of the pickup 28. Similarly, the signal from the resolver coil 58 representing the cosine of the desired angle position is introduced to a multiplier unit 62 which also has an input from the demodulator 38 representing the sine of the actual displacement angle.

These multipliers may be of any common analog type which provide voltage output signals as functions of both their inputs. Such types include the square-law, time division, servo, and other varieties.

The multipliers 60 and 62 both provide their outputs to a difference block 64 which acts to provide an output signal along its line 42 which is equal to the algebraic difference between the outputs of the multipliers 60 and 62. This circuit 64 may also be of any well known analog variety.

The comparator circuit 40 thus operates in accordance with the equation: (sine $\theta_1$ cosine $\theta_2$)−(cosine $\theta_1$ sine $\theta_2$)=0. In this manner, the servo 44 drives the load 34 and the pickup 28 to a position whereby the angle $\theta_1$ (input angle)=the angle $\theta_2$ (position angle).

It should be understood that other comparator circuits might be used and the input signal might be provided in a variety of other forms. The essence of the system is the utilization of the sine and cosine displaced pickup signals and their comparison with similar input signals to provide a control output.

FIGURE 2 illustrates a demodulator such as might be used in connection with blocks 22, 36, and 38 of the embodiment of FIGURE 1. The input signal is provided to a high permeability core transformer 66 which has a center-tapped secondary. Similarly the keying input is provided to a high permeability core transformer 68 with a center-tapped and grounded secondary. The secondary of the keying transformer 68 connects to a ring of four diodes 70, 72, 74 and 76 through four resistors 78, 80, 82, and 84. The secondary of the input transformer 66 connects to the two midpoints of this ring by means of potentiometers 86 and 88. The potentiometers are used to balance out any dissimilarities between the various diodes and resistors. The diodes constitute a full wave ring demodulator. They key voltage causes alternate diode pairs to be saturated thus alternately grounding the two halves of the signal transformer's secondary. The arrangement is such that a D.C. output voltage is provided from the center-tap of the input transformer along line 86. This voltage varies from zero when the key input and the signal input are 90 degrees out of phase to a maximum when the key input and the signal input are in-phase. In this manner the output on line 86 varies as a sinusoidal function of the phase displacement between the key input and the signal input.

FIGURE 3 illustrates an alternate embodiment of the invention. Rather than generating a magnetic standing wave along the magnetrostrictive line this embodiment generates a sonic standing wave. The embodiment also illustrates the possibility of achieving coarse and fine positioning by generating successively closer standing waves.

The embodiment utilizes an elongated tube 81 in which a sonic signal is generated by a loud speaker 83 which provides output from a sonic generator 85. At the far end of the tube 81 the sonic wave is reflected by a termination 87 in such a phase relationship so as to form a standing wave. In this embodiment no means are illustrated for controlling the generator so as to insure proper frequency to attain a standing wave but such means might be provided in accordance with the demonstration of the previous embodiment.

The pickup comprises a microphone 89 which is physically attached to a load 90 and is driven by a motor 92 through a servo control system 94. The output of the microphone is fed as a signal voltage to a demodulator 96 which has a key input 98 from the sonic generator 85. The output of the demodulator, which is a sinusoidal function of the position of the microphone 89 with respect to one standing wave (it is only unambiguous with respect to a quarter cycle of the wave length) is fed to a comparator 100 along line 102. The comparator has input from line 104 which provides the desired position signal and provides output along a line 106 to drive the servo 94.

The sonic generator is capable of providing output along any of three frequencies which are selected so as to provide standing waves along the tube 81. The frequency switching is done under the control of a three position switch 108. This switch is physically ganged to another switch 110 which provides input from a three line signal source 112. The source provides three voltages which represent coarse, medium, and fine components of a composite desired position signal. When the switch 108 is adjusted so as to provide the longest standing wave the switch 110 is connected to the coarse positioning signal. A half of the wave length of this standing wave represents the maximum excursion of the pickup 89 which might alternately be geared to provide a greater excursion of the load. After the pickup is positioned with respect to this long standing wave, switches 108 and 110 are switched so as to provide a shorter standing wave for medium positioning. They are then switched to provide a relatively short standing wave which is used to achieve fine positioning.

Similar techniques might be used along with a plurality of sonic generators to provide coarse, medium and fine positioning signals simultaneously which might be mixed to control the position of the load.

Having thus described my invention, I claim:

1. A position transducer, comprising: an elongated member formed of a magnetostrictive material supported in a taut manner between two terminations; a first, generator coil wrapped about said member adjacent to one of its terminations; a voltage controlled variable frequency, sinusoidal electrical generator connected to said coil, whereby said electrical signals cause variations in the magnetic field of said coil and induce sinusoidally varying length variations in said member; a first pickup coil wrapped about said member adjacent to the second of its terminations and operative to generate an electrical signal proportional to the changes in the length of said member at the point of disposition of said first pickup at any particular instance; electrical circuitry means connecting said first pickup coil and said voltage controlled generator in such a manner as to cause the signals from said first pickup to vary the frequency of the generator so as to maintain a standing wave along said member; and a second pickup coil wrapped about said member and movable along its length, operative to generate an electrical signal proportional to the changes in the length of said member at the point of disposition of said second pickup at any particular instant.

2. Apparatus for determining position along a path comprising,
    generating means disposed to propagate a periodic wave of particular frequency along said path,
    a first detector disposed at a reference position in said path to produce a first electrical signal which is a function of at least one of the characteristics of the periodic wave at the reference position, said reference position being a particular number of wavelengths from the generating means,
    means for varying the frequency of the generating means in accordance with the first electrical signal to keep constant the number of wavelengths between the generating means and the reference position, and
    a second detector movable along said path to produce a second electrical signal which is a function of at least one of the characteristics of the periodic wave at the position of the second detector and which provides an indication of the position of the second detector along said path.

3. Apparatus as recited in claim 2 wherein the periodic wave is sinusoidal.

4. Apparatus as recited in claim 2 wherein said path is provided by an elongated magnetostrictive member along which the periodic wave is propogated, said magnetostrictive member being drawn tautly between two support means.

5. Apparatus as recited in claim 2 wherein the second detector includes a pair of pickup devices disposed a quarter wavelength apart along said path.

6. Apparatus as recited in claim 2 including means for changing the frequency of the periodic wave propogated by the generating means to change the number of wavelengths provided between the generating means and the first detector so as to obtain a desired accuracy of the position indication provided by the second detector.

References Cited in the file of this patent
UNITED STATES PATENTS

| | | |
|---|---|---|
| 2,830,267 | Broussaud et al. | Apr. 8, 1958 |
| 2,872,577 | Hart | Feb. 3, 1959 |
| 2,947,929 | Bower | Aug. 2, 1960 |
| 3,003,239 | Weidner et al. | Oct. 10, 1961 |
| 3,034,077 | Kretzmer et al. | May 8, 1962 |